(12) United States Patent
Nowicki, Jr. et al.

(10) Patent No.: US 6,435,017 B1
(45) Date of Patent: Aug. 20, 2002

(54) SNAP-FIT SENSING APPARATUS

(75) Inventors: James Lee Nowicki, Jr., Chicago; Arthur P. Wicklein, Antioch, both of IL (US); Donald Lee Gramlich, Jr., Grosse Ile, MI (US); Michael Paul Josef Wache, Wiesbaden (DE)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/526,358

(22) Filed: Mar. 16, 2000

(51) Int. Cl.[7] .............................................. G01M 15/00
(52) U.S. Cl. .......................... 73/116; 73/118.2; 403/93; 403/94; 403/96
(58) Field of Search ................................ 73/118.2, 121, 73/129, 116, 202.5, 204.11, 204.19; 439/9; 279/2.04, 19.4, 2.17; 403/92, 96, 93, 94

(56) References Cited

U.S. PATENT DOCUMENTS

| | | | |
|---|---|---|---|
| 1,076,032 A | * | 10/1913 | Gilling |
| 4,654,643 A | * | 3/1987 | Meisenheimer, Jr. |
| 5,261,272 A | * | 11/1993 | Rush, II et al. ............. 73/118.2 |
| 5,559,286 A | * | 9/1996 | White et al. .................... 73/129 |
| 5,562,357 A | * | 10/1996 | Sandell |
| 5,567,874 A | * | 10/1996 | Suzuki et al. .............. 73/118.2 |
| 5,571,960 A | * | 11/1996 | Tateishi et al. ............. 73/118.2 |
| 5,600,870 A | * | 2/1997 | Fields et al. |
| 5,681,990 A | * | 10/1997 | Hampo et al. .............. 73/118.2 |
| 5,844,135 A | * | 12/1998 | Brammer et al. ........... 73/118.2 |
| 6,112,583 A | * | 9/2000 | Yamamura .................... 73/116 |
| 6,212,946 B1 | * | 4/2001 | Naegele et al. ............. 73/118.2 |

* cited by examiner

Primary Examiner—Eric S. McCall
(74) Attorney, Agent, or Firm—Gary J. Cunningham; Steven A. May; Thomas V. Miller

(57) ABSTRACT

A snap-fit sensing apparatus (20) for use in automotive applications including a housing (22) having a pair of flexible arms (30), a top portion (24), and a bottom portion (26), the flexible arms (30) extending from the top portion (24) to the bottom portion (26), at least one of the flexible arms (30) comprises a locking flange (32). The sensing apparatus (20) also includes a retaining mechanism (40) fixedly connected with the top portion (24), the retaining mechanism (40) securing the sensing apparatus (20) in place. In one preferred embodiment, the sensing apparatus (20) further comprises a sensor (50) located within the housing (22) for sensing one of temperature and pressure. In one preferred embodiment, the flexible arms (30) are connected with the top portion (24) and the bottom portion (26). In one preferred embodiment, the retaining mechanism (40) is a wave spring (42) fixedly connected with the top portion (24), wherein the wave spring (42) has a retaining flange (44) for securing the snap-fit sensing apparatus (20) in place.

20 Claims, 6 Drawing Sheets

SNAP-FIT SENSING APPARATUS

FIELD OF THE INVENTION

This invention relates, in general, to a sensing device, and more particularly, to a snap-fit sensing apparatus for use in automotive applications including a housing having a pair flexible arms and a retaining mechanism to secure the snap-fit sensing apparatus in place.

BACKGROUND OF THE INVENTION

In the automotive industry it is common to employ the use of sensing devices. These sensing devices are often mounted onto parts such as intake manifolds and gasoline tanks to monitor variables such as temperature, pressure, emission levels and many other useful parameters. Typically, these sensing devices have a housing that is designed to mate with a hole formed in the part. The housing often is surrounded by an o-ring which is used to create a seal between the part and the housing. Additionally, the housing often includes a sensor used to monitor conditions within the part. Installing these sensing devices in a simple, cost efficient, and effective manner is very important, especially in the automotive industry.

Often times, installing sensing devices is not simple and can be a rather cumbersome task. For example, some sensing devices employ a camlock rollover mechanism which requires a twisting motion, instead of a simple push motion, in order to insert the sensing device into the hole, secure the sensing device, and complete the installation. The twisting motion can damage the o-ring and compromise the seal. Additionally, if the sensor is being inserted by a person, the repeated twisting motion can injure this person. Other sensing devices require the use of a separate clip to secure the sensing device once the sensing device is in the hole. The use of a separate clip makes securing the sensing device in the hole a two-step process since the sensing device must first be placed in the hole and then a separate clip must be attached to the sensing device to secure the device in the hole, thus increasing the amount of time required to install the sensing device. Some sensing devices employ the use of snap arms located on the sensor which lock the sensing device once the sensing device has been placed in the hole. However, the snap arms are not easily accessible and thus make removable of the sensing device difficult. Accordingly, further development of sensing devices and mounting methods is necessary to simplify the installation process of these sensing devices.

Figure 1:
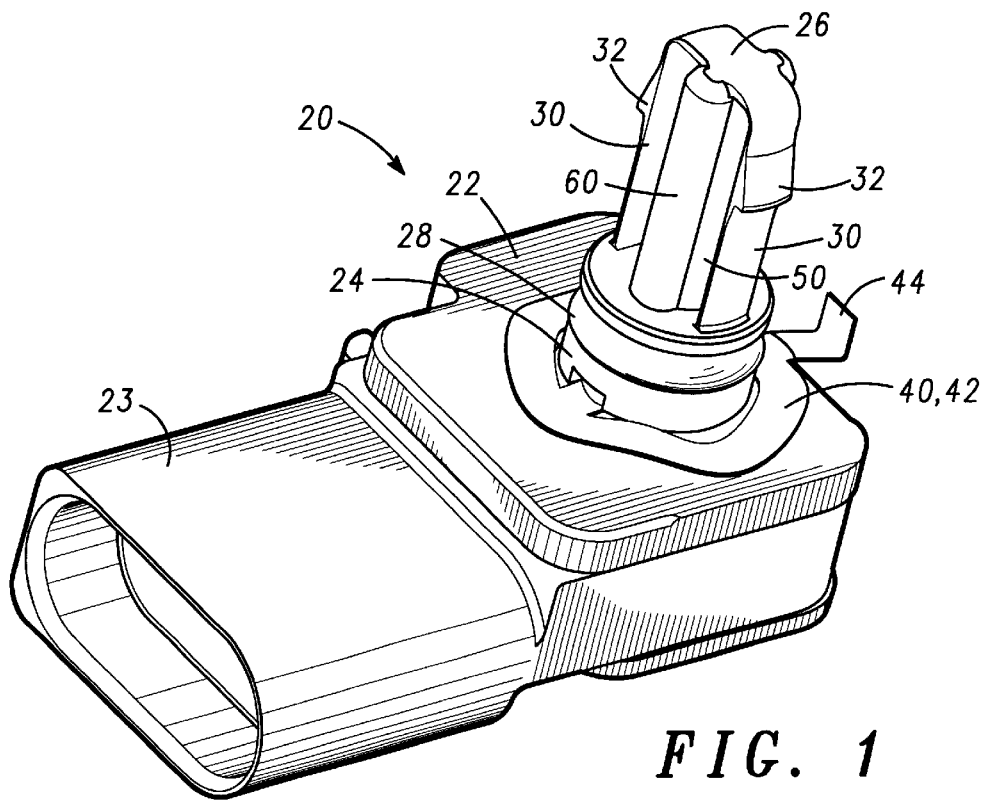
FIG. 1 is a perspective view of a snap-fit sensing apparatus, according to one preferred embodiment.

It will be appreciated that for simplicity and clarity of illustration, elements shown in the FIGURES have not necessarily been drawn to scale. For example, the dimensions of some of the elements are exaggerated relative to each other. Further, where considered appropriate, reference numerals have been repeated among the FIGURES to indicate corresponding elements.

DETAILED DESCRIPTION OF THE INVENTION

In view of the above limitations of existing sensing devices, it is an aspect of the present invention to provide a snap-fit sensing apparatus for use in automotive applications. The sensing apparatus comprises a housing having a pair of flexible arms, a top portion, and a bottom portion. The flexible arms extend from the top portion to the bottom portion, wherein at least one of the flexible arms comprises a locking flange. The sensing apparatus also comprises a retaining mechanism fixedly connected with the top portion, the retaining mechanism securing the snap-fit sensing apparatus in place. In one preferred embodiment, the sensing apparatus further comprises a sensor located within the housing for sensing one of temperature and pressure. In one preferred embodiment, the flexible arms of the sensing apparatus are connected with the top portion and the bottom portion. In one preferred embodiment, the retaining mechanism of the sensing apparatus is a wave spring fixedly connected with the top portion, wherein the wave spring has a retaining flange for securing the snap-fit sensing apparatus in place.

Shown in FIG. I is a snap-fit sensing apparatus 20 for use in automotive applications. Sensing apparatus 20 comprises housing 22, retaining mechanism 40, and sensor 50. In one preferred embodiment housing 22 houses electronic components, such as electronic sensors, semiconductor chips, PCB boards, batteries, resistive elements, and capacitive elements. Preferably, housing 22 is manufactured from materials that are rigid enough to protect the electronic components and that have elements designed to shield the electronic components from heat, water, and electrostatic charge. In one preferred embodiment, housing 22 is sealed to prevent elements such as dust and water from entering housing 22 and damaging the electronic components. Housing 22 can be manufactured from any known material used to manufacture housings, especially housing used for automotive sensors. Preferably, housing 22 is manufactured from an engineering grade plastic which is resistant to chemicals and elements commonly found in an automobile. In one preferred embodiment, housing comprises connector 23 for connecting the electronic components within housing 22 to a power supply, a centralized computer, or another electronic component, as illustrated in FIGS. 1–5.

Figure 2:
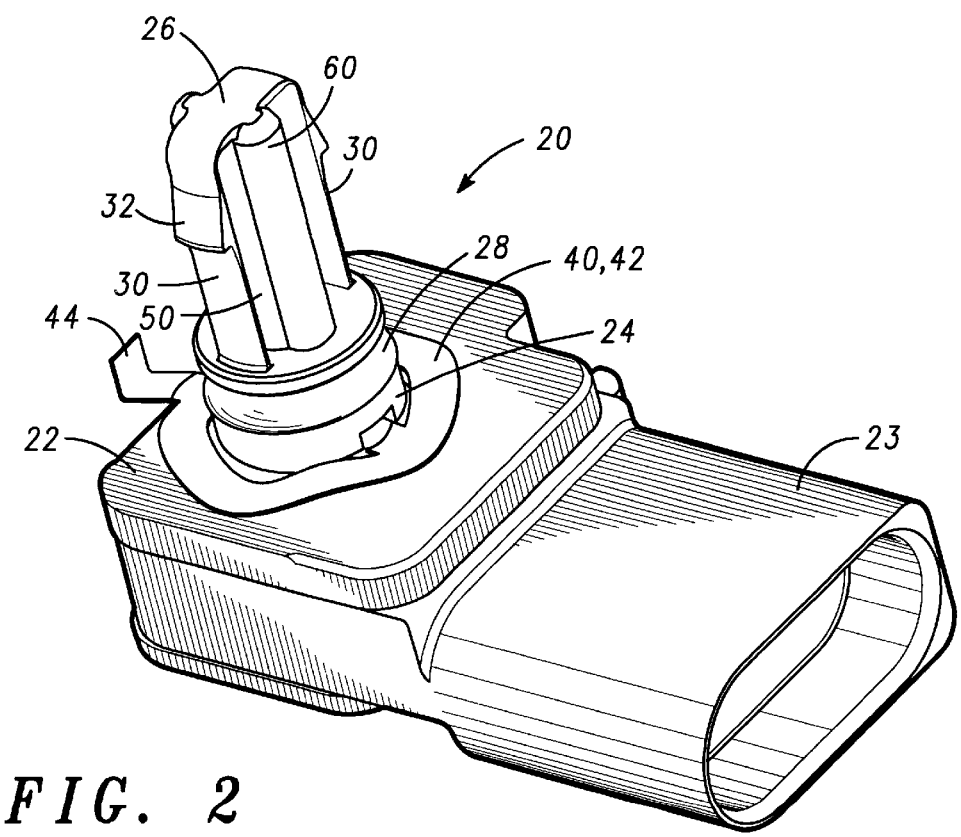
FIG. 2 is another perspective view of the snap-fit sensing apparatus shown in FIG. 1, according to one preferred embodiment.
Figure 5:
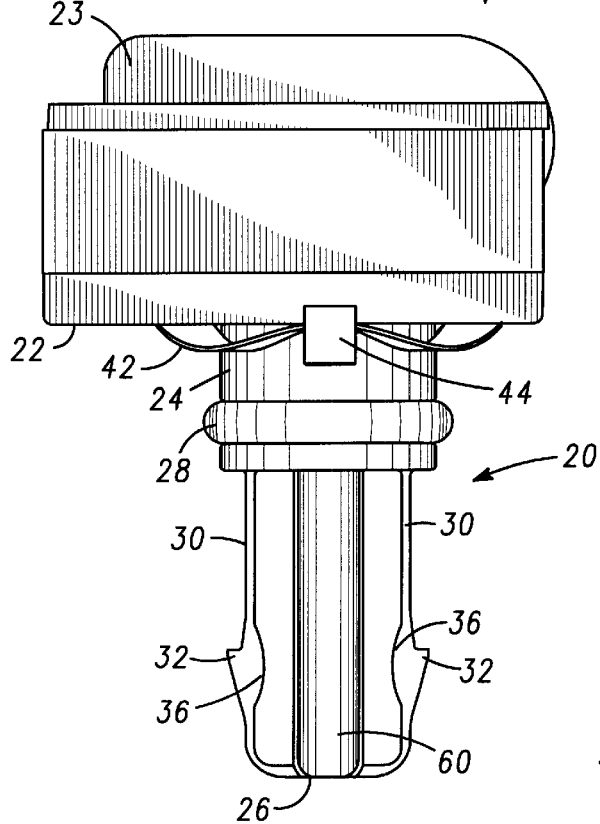
FIG. 5 is a rear view of the snap-fit sensing apparatus shown in FIG. 4, according to one preferred embodiment.
Figure 12:
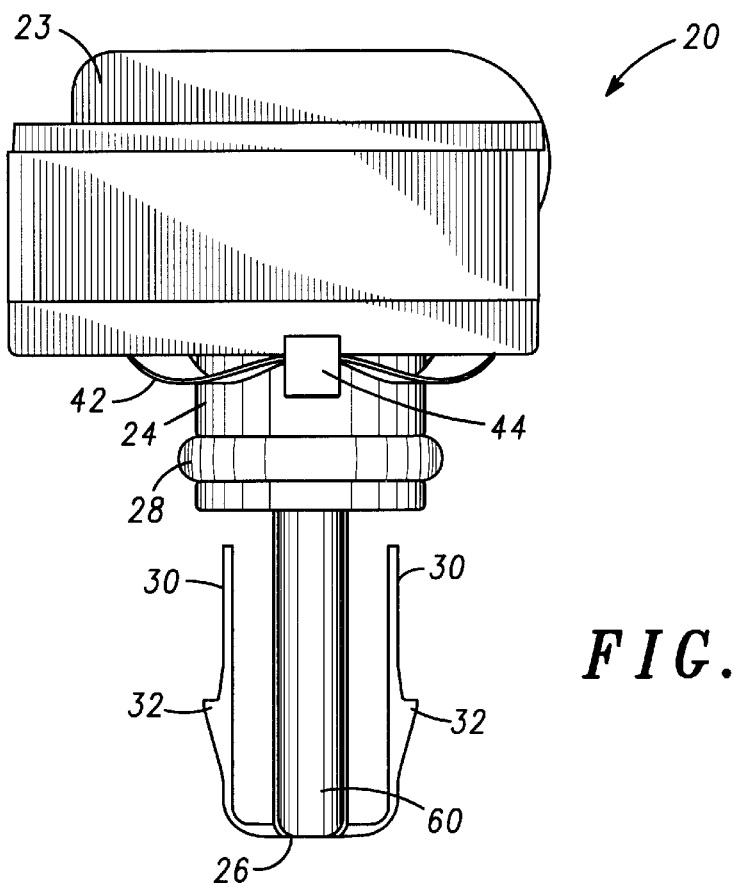
FIG. 12 is a rear view of a snap-fit sensing apparatus, according to one preferred embodiment.
Figure 13:
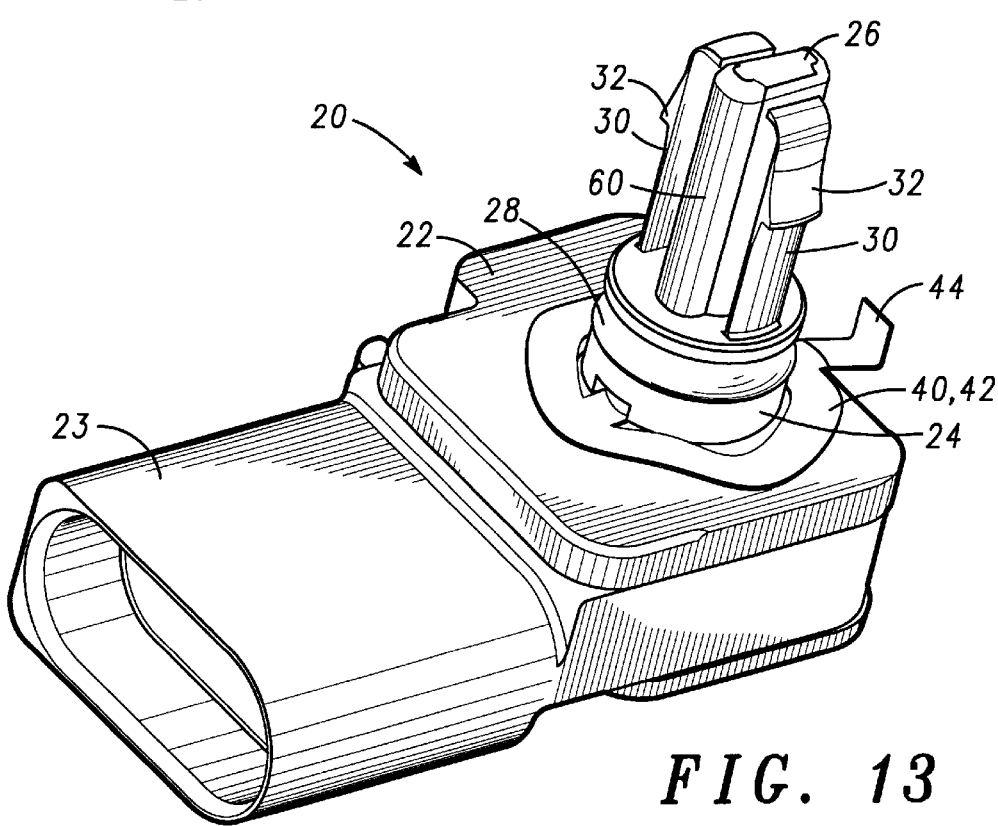
FIG. 13 is a perspective view of a snap-fit sensing apparatus, according to one preferred embodiment.

Housing 22 comprises a pair of flexible arms 30, top portion 24, and preferably bottom portion 26 opposed to top portion 24, as illustrated in FIGS. 1 and 2. Flexible arms 30 extend from top portion 24 to bottom portion 26, as illustrated in FIG. 5. Flexible arms 30 are designed to bend inwards towards each other as housing 22 is inserted into hole 70. Preferably, flexible arms 30 are connected with and extend from top portion 24 to bottom portion 26. By connecting flexible arms 30 with both top portion 24 and bottom portion 26, sensor 50 can be better protected. However, flexible arms 30 may be connected to only one of top portion 24 or bottom portion 26, as illustrated in FIGS. 12 and 13. Preferably, flexible arms 30 are manufactured from a flexible material such as plastic. In one preferred embodiment, flexible arms 30, top portion 24, and bottom portion 26 are manufactured from the same material as housing 22. In one preferred embodiment, flexible arms 30, top portion 24, bottom portion 26, and at least part of housing 22 are manufactured using an injection molding process. In one preferred embodiment, flexible arms comprise bulge 36 opposed to and partially above locking flange 32, as illustrated in FIG. 5. Bulge 36 provides additional structural support and prevents flexible arms 30 from breaking or cracking when inserted into hole 70.

At least one flexible arm 30 comprises locking flange 32. Locking flange 32 extends outwards from flexible arm 30, as illustrated in FIG. 5, and is designed to help secure the position of sensing apparatus 20 once sensing apparatus 20 is inside hole 70. In one preferred embodiment, locking flange 32 is wedge shaped in order to ease the entry of sensing apparatus 20 into hole 70, as illustrated in FIGS. 2 and 5. In one preferred embodiment both flexible arms 30 comprise locking flange 32.

Figure 4:
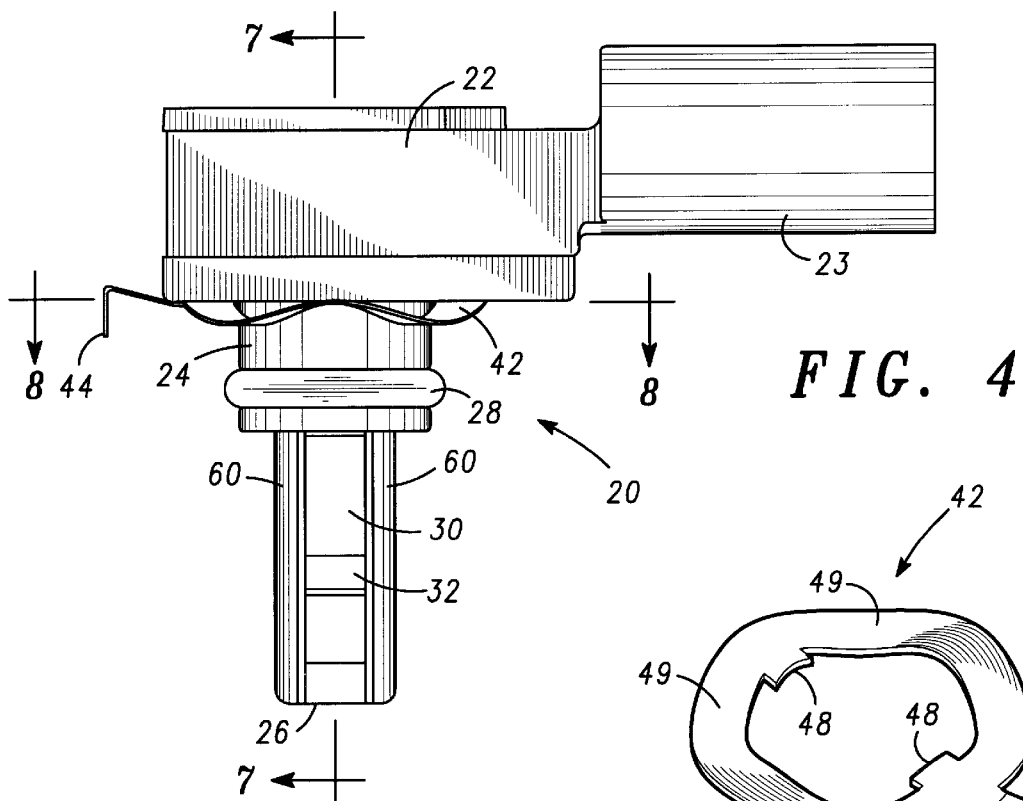
FIG. 4 is a side view of the snap-fit sensing apparatus shown in FIG. 1, according to one preferred embodiment.
Figure 7:
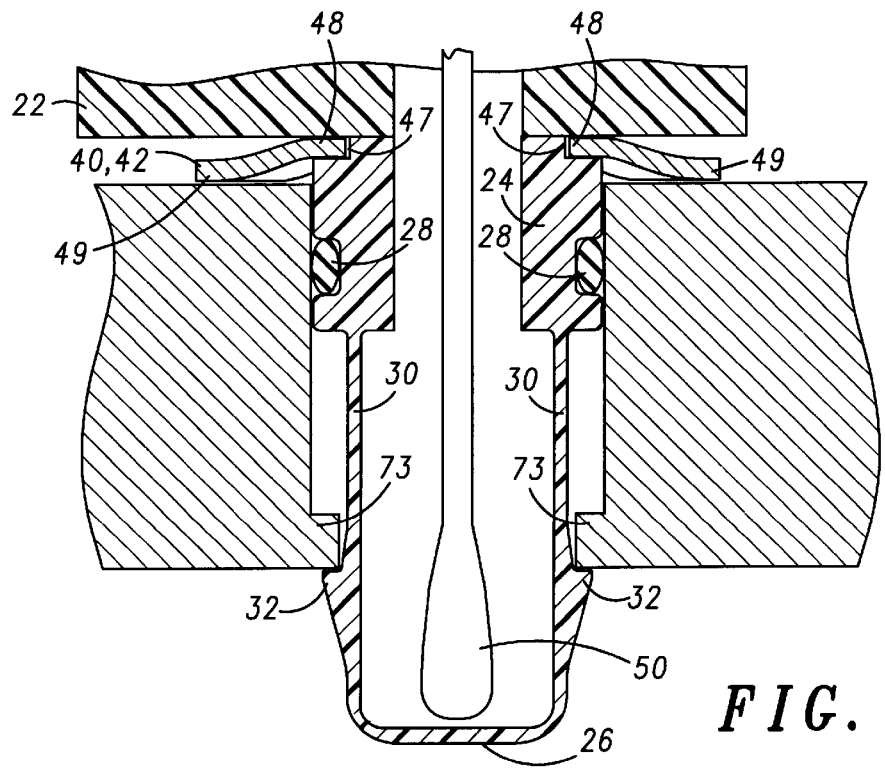
FIG. 7 is a cross-sectional view of the snap-fit sensing apparatus shown in FIG. 4, according to one preferred embodiment.

Top portion 24 is connected with housing 22. In one preferred embodiment, as described above, top portion 24 is connected with flexible arms 30, as illustrated in FIGS. 5 and 13. In one preferred embodiment, top portion 24 comprises an o-ring seal 28, as illustrated in FIGS. 4, 5 and 7. O-ring seal 28 prevents materials, such as vapor or liquid, from exiting chamber 80 when sensing apparatus 20 is mounted in hole 70 and connected with chamber 80. Chamber 80 houses the materials, such as vapor or liquid, which sensing apparatus 20 can be used to monitor. For example, chamber 80 can be an intake manifold, and sensing apparatus 20 can be used to monitor the air pressure and the temperature within the intake manifold. Preferably, o-ring seal 28 is manufactured from a material which can form a good seal with hole 70, such as rubber, silicone, and fluorosilicones.

In one preferred embodiment, housing 22 comprises bottom portion 26. Bottom portion 26 is used to support at least one of flexible arms 30 and semirigid arms 60. In one preferred embodiment, bottom portion 26 is used to connect semi-rigid arms 60 to each other, as shown in FIG. 13. In one preferred embodiment, bottom portion 26 is used to connect flexible arms 30 to each other. In one preferred embodiment, bottom portion 26 is used to connect flexible arms 30 to each other and to connect semi-rigid arms 60 to each other, as illustrated in FIG. 1.

Figure 6:
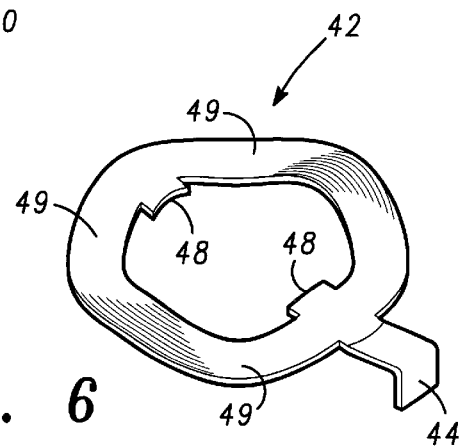
FIG. 6 is a perspective view of a wave spring used in a snap-fit sensing apparatus, according to one preferred embodiment.
Figure 8:
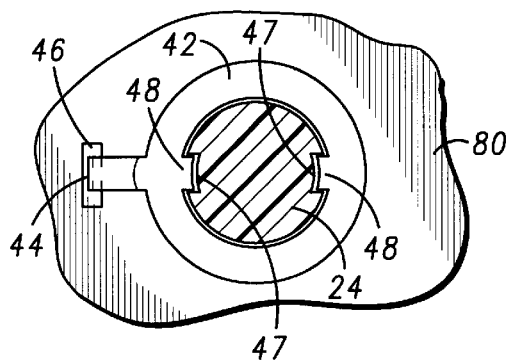
FIG. 8 is a cross-sectional view of the snap-fit sensing apparatus shown in FIG. 7, according to one preferred embodiment.

Retaining mechanism 40 is fixedly connected with top portion 24, as illustrated in FIG. 1. Retaining mechanism 40 is used to secure sensing apparatus 20 in place, once sensing apparatus 20 has been inserted into hole 70. Retaining mechanism 40 comprises any mechanism known to one of ordinary skill in the art, which can secure sensing apparatus 20 in place once sensing apparatus 20 has been inserted into hole 70, such as, for example, an alligator clip, a clamp, a magnet, a hook and loop type fastener (such as a strip of VELCRO™), a nut and bolt arrangement, a snap-fit arrangement or any other comparable coupling mechanism which can be removably coupled to a second object, such as chamber 80. In one preferred embodiment, retaining mechanism 40 comprises wave spring 42, as illustrated in FIG. 1. Wave spring 42 comprises retaining flange 44 for securing sensing apparatus 20 in place, as illustrated in FIGS. 6–7. Retaining flange 44 mates with retaining notch 46, as illustrated in FIGS. 7–8. By mating with retaining notch 46, retaining flange 44 prevents sensing apparatus 20 from substantially moving and therefore secures sensing apparatus 20 in place. In one preferred embodiment, wave spring comprises a series of folds 49, as illustrated in FIGS. 6–7. Folds 49 press against chamber 80 and are used to force locking flange 32 up against posts 73, as illustrated in FIG. 7. By forcing locking flange 32 up against posts 73, folds 49 help secure sensing apparatus 20 in place and prevent sensing apparatus 20 from vibrating in chamber 80. Retaining mechanism 40 is fixedly connected with top portion 24 using any sort of mechanism which can fixedly secure one object to a second object, such as such as, for example, a snap-fit arrangement, a nut and bolt arrangement, glue, a weld, or any other comparable coupling mechanism which can be fixedly coupled to a second object. In one preferred embodiment, retaining mechanism 40 comprises at least one tab 48 which is inserted into a notch 47 located in top portion 24 of housing 22, as illustrated in FIGS. 6–8, in order to fixedly connect retaining mechanism 40 to top portion 24.

Sensor 50 is located within housing 22, as illustrated in FIG. 1. Sensor 50 is any device or series of devices that can respond to a physical stimulus, such as heat, light, sound, pressure, magnetism, or a particular motion, and transmit a resulting impulse, such as for measurement or operating a control. For example, sensor 50 can comprise sensing devices such as a thermistor, a thermocouple, and a photodiode. In one preferred embodiment, sensor 50 can sense one of temperature and pressure. In one preferred embodiment, housing 22 comprises semi-rigid arms 60 and bottom portion 26 in order to prevent damage to sensor 50, as illustrated in FIGS. 1–2, and FIGS. 4–5. Semi-rigid arms 60 are connected with both top portion 24 and bottom portion 26. In one preferred embodiment, flexible arms 30 are connected with both top portion 24 and bottom portion 26, as illustrated in FIG. 1, in order to prevent damage to sensor 50.

Figure 3:
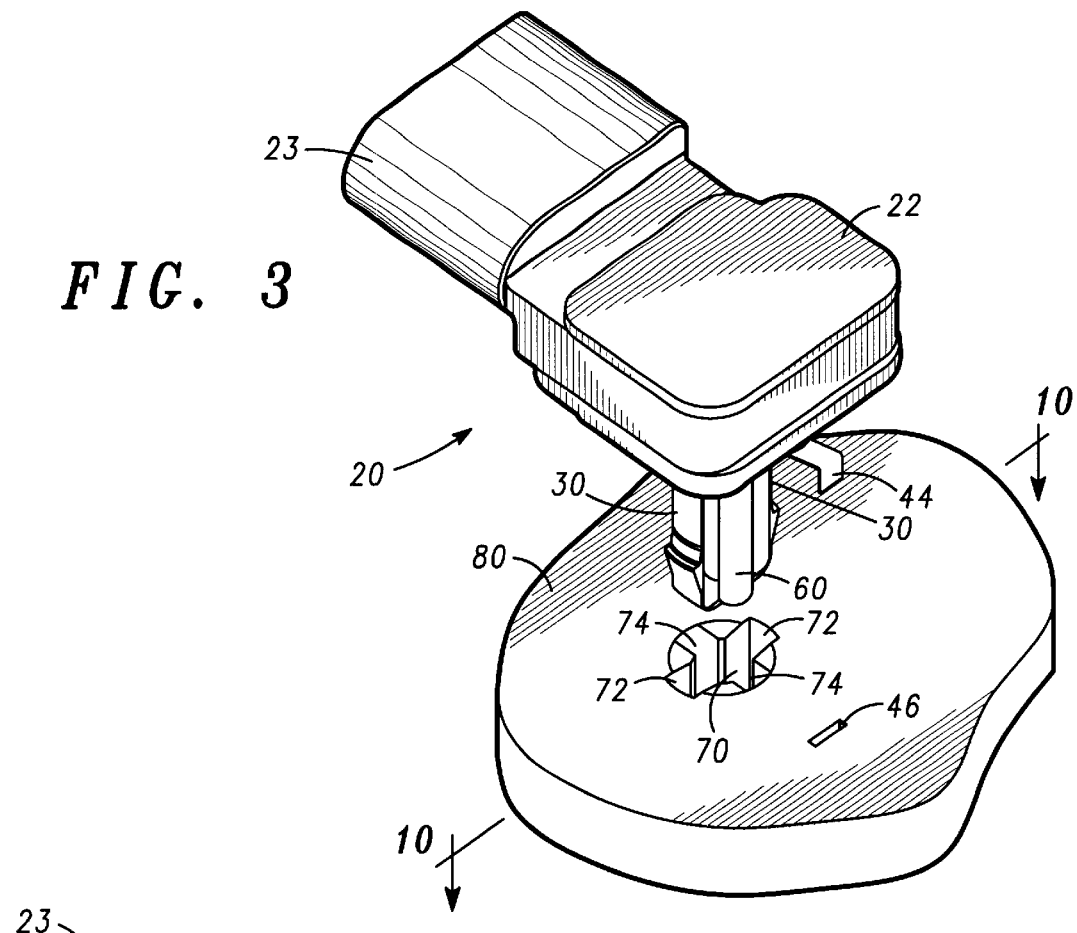
FIG. 3 is a perspective view of a snap-fit sensing apparatus positioned to mate with a surface, according to one preferred embodiment.
Figure 9:
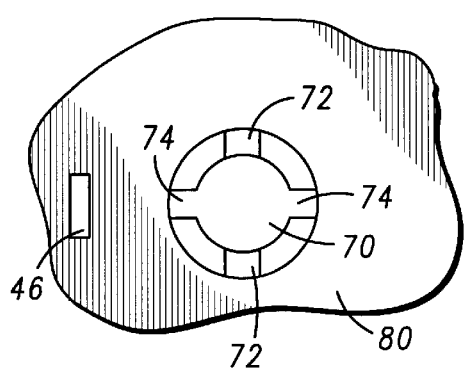
FIG. 9 is a top view of the part and the hole in which the snap-fit sensing apparatus shown in FIG. 1 is mated with, according to one preferred embodiment.
Figure 10:
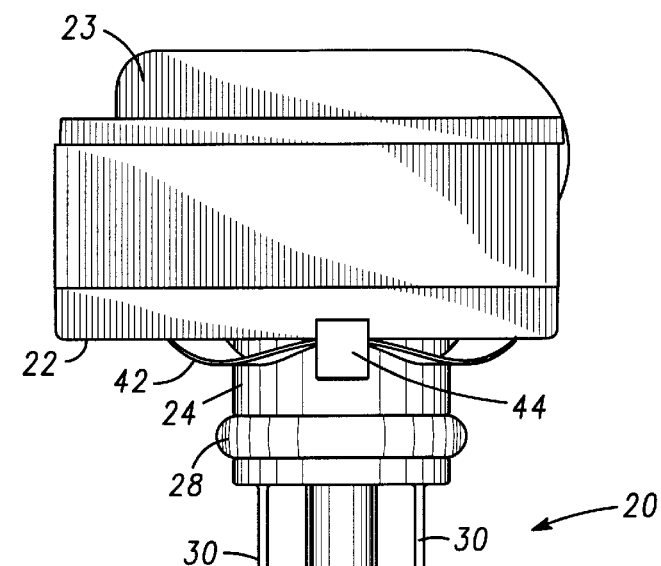
FIG. 10 is a rear view of the snap-fit sensing apparatus being inserted into a hole, according to one preferred embodiment.
Figure 10:
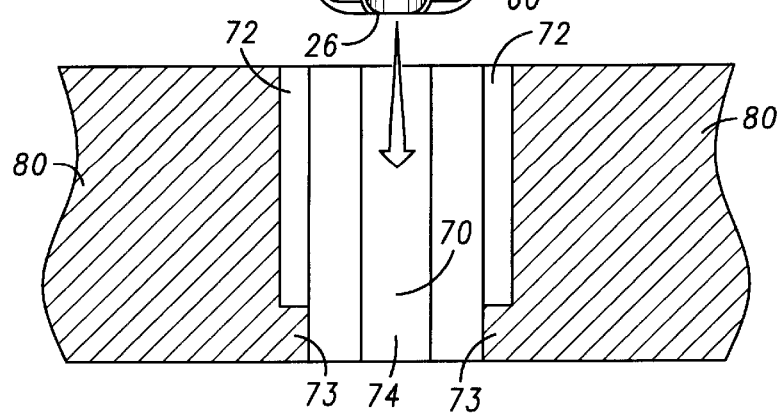

Snap-fit sensing apparatus 20 is inserted into hole 70 by inserting flexible arms 30 into hole 70, as illustrated in FIGS. 3 and 10. As sensing apparatus 20 is inserted into hole 70, locking flange 32 is push inwards and towards sensor 50. When locking flange 32 reaches the end of hole 70, locking flange 32 then springs outwards and back to its original position. In one preferred embodiment, retaining flange 44 is inserted into retaining notch 46 to prevent sensing apparatus 20 from substantially moving and therefore secure sensing apparatus 20 in place. In one preferred embodiment, folds 49 of wave spring 42 press against chamber 80 and force locking flange 32 up against posts 73. In one preferred embodiment, sensing apparatus 20 comprises at least one entrance groove 72, as illustrated in FIGS. 9–10. By mating with locking flange 32, entrance groove 72 is able to guide sensing apparatus 20 into hole 70.

Figure 11:
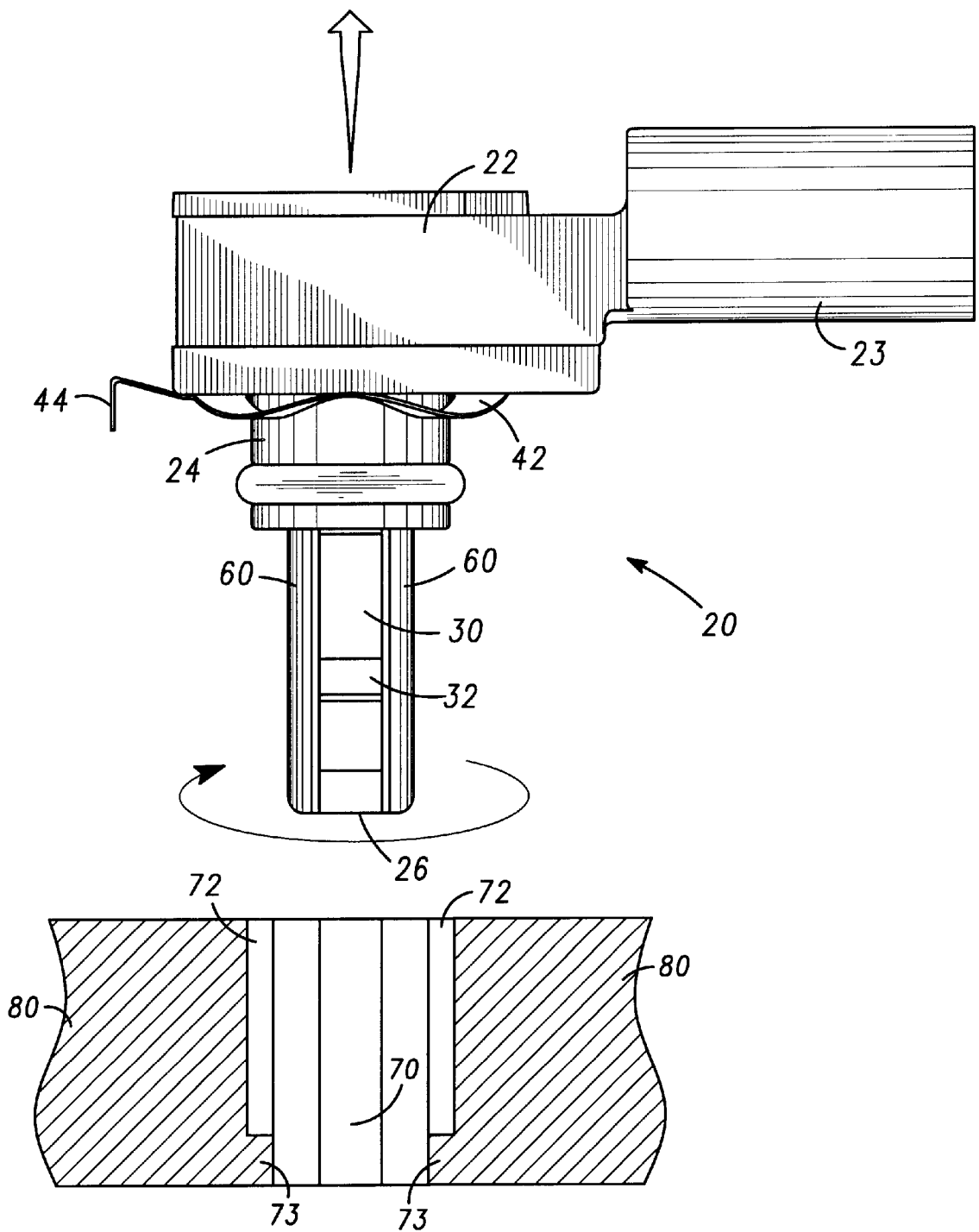
FIG. 11 is a side view of the snap-fit sensing apparatus being removed from a hole, according to one preferred embodiment.

Snap fit sensing apparatus 20 is removed from hole 70 by decoupling retaining mechanism 40 from chamber 80, rotating sensing apparatus 20 so that locking flange 32 lines up with exit notch 74 and pulling sensing apparatus from hole 70, wherein exit notch 74 guides locking flange 32 and flexible arms 30 guided through hole 70, as illustrated in FIG. 11. In one preferred embodiment, retaining mechanism 40 is decoupled from chamber 80 by pulling retaining flange 44 out from retaining notch 46.

Thus is it apparent that there has been provided, in accordance with the invention, a snap-fit sensing apparatus that fully meets the advantages set forth above. Although the invention has been described and illustrated with reference to specific illustrative embodiments thereof, it is not intended that the invention be limited to those illustrative embodiments. Those skilled in the art will recognize that variations and modifications can be made without departing from the spirit of the invention. It is therefore intended to include within the invention all such variations and modifications that fall within the scope of the appended claims and equivalents thereof.

We claim:

1. A removable snap-fit sensing apparatus for installation in automotive applications, the removable apparatus comprising:

a housing having a pair of flexible arms, a top portion, and a bottom portion, the flexible arms extending from the top portion to the bottom portion, at least one of the flexible arms comprises a locking flange; and a retaining mechanism fixedly connected with the top portion for securing the removable snap-fit sensing apparatus in an installed position in an automotive application;

wherein the removable snap-fit sensing apparatus is configured to be removed from the installed position by decoupling the retaining mechanism and rotating the removable snap-fit sensing apparatus to a removable position.

2. The removable snap-fit sensing apparatus of claim 1 further comprising a sensor located within the housing for sensing one of temperature and pressure.

3. The removable snap-fit sensing apparatus of claim 1 wherein the flexible arms are connected with the top portion and the bottom portion.

4. The removable snap-fit sensing apparatus of claim 1 wherein the top portion further comprises an o-ring seal.

5. The removable snap-fit sensing apparatus of claim 1 wherein the retaining mechanism is a retaining flange.

6. The removable snap-fit sensing apparatus of claim 1 further comprising a pair of semi-rigid arms extending from the top portion to the bottom portion.

7. A removable snap-fit sensing apparatus for installation in automotive applications, the removable apparatus comprising:

a housing having a pair of flexible arms, a top portion, and a bottom portion, the flexible arms connected with and extending from the top portion to the bottom portion;

a wave spring fixedly connected with the top portion, the wave spring having a retaining flange securing the removable snap-fit sensing apparatus in an installed position in an automotive application; and a sensor located within the housing, the sensor sensing one of temperature and pressure.

8. The removable snap-fit sensing apparatus of claim 7 further comprising a pair of semi-rigid arms extending from the top portion to the bottom portion.

9. The removable snap-fit sensing apparatus of claim 8 wherein one semi-rigid arm is opposed to the other semi-rigid arm.

10. The removable snap-fit sensing apparatus of claim 8 wherein one flexible arm is opposed to the other flexible arm, each flexible arm comprises a locking flange.

11. The removable snap-fit sensing apparatus of claim 7 further comprising an o-ring seal around the top portion.

12. The removable snap-fit sensing apparatus of claim 11 wherein the top portion is generally cylindrical in shape, and the o-ring seal is generally toroidal in shape.

13. A removable snap-fit sensing apparatus for use in automotive applications, the removable snap-fit sensing apparatus to be mated with a hole, the removable apparatus comprising:

a housing having a pair of flexible arms, a top portion, a bottom portion, the flexible arms connected with the top portion and the bottom portion, and a locking flange located on at least one of the flexible arms;

a retaining mechanism fixedly connected with the top portion for securing the snap-fit sensing apparatus in an installed position when disposed in the hole; and a sensor located within the housing;

wherein the removable snap-fit sensing apparatus is configured to be removed from the installed position by decoupling the retaining mechanism and rotating the removable snap-fit sensing apparatus within the hole to a removable position.

14. The removable snap-fit sensing apparatus of claim 13 wherein the hole forms at least one exit notch designed to mate with each locking flange when the removable snap-fit sensing apparatus is in the removable position.

15. The removable snap-fit sensing apparatus of claim 13 wherein the sensor senses one of temperature and pressure.

16. The removable snap-fit sensing apparatus of claim 13 wherein the retaining mechanism comprises a wave spring fixedly connected with the top portion, the wave spring having a retaining flange securing the removable snap-fit sensing apparatus in place when the removable snap-fit sensing apparatus is in the installed position.

17. The removable snap-fit sensing apparatus of claim 13 wherein the hole forms an entrance groove for guiding the removable snap-fit apparatus into the hole.

18. The removable snap-fit sensing apparatus of claim 17 wherein the entrance groove mates with the locking flange.

19. The removable snap-fit sensing apparatus of claim 13 further comprising a pair of locking flanges, each locking flange located on each flexible arm.

20. The removable snap-fit sensing apparatus of claim 13 further comprising an o-ring seal around the top portion.

* * * * *